(12) United States Patent
Cao

(10) Patent No.: US 11,347,111 B2
(45) Date of Patent: May 31, 2022

(54) METHOD FOR MANUFACTURING DISPLAY PANEL AND DISPLAY PANEL

(71) Applicants: CHONGQING HKC OPTOELECTRONICS TECHNOLOGY CO., LTD., Chongqing (CN); HKC CORPORATION LIMITED, Shenzhen (CN)

(72) Inventor: Junhong Cao, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 621 days.

(21) Appl. No.: 16/311,175

(22) PCT Filed: Oct. 23, 2018

(86) PCT No.: PCT/CN2018/111387
§ 371 (c)(1),
(2) Date: Dec. 19, 2018

(87) PCT Pub. No.: WO2020/062372
PCT Pub. Date: Apr. 2, 2020

(65) Prior Publication Data
US 2021/0223587 A1 Jul. 22, 2021

(30) Foreign Application Priority Data
Sep. 30, 2018 (CN) .......................... 201811160561.2

(51) Int. Cl.
*G02F 1/1339* (2006.01)

(52) U.S. Cl.
CPC .................................. *G02F 1/1339* (2013.01)

(58) Field of Classification Search
None
See application file for complete search history.

(56) References Cited

U.S. PATENT DOCUMENTS

| 6,565,932 B2 | 5/2003 | Iwamatsu et al. |
| 7,179,673 B2 | 2/2007 | Song et al. |
| 2006/0139505 A1* | 6/2006 | Yoshinaga ............ G02F 1/1345 349/43 |

(Continued)

FOREIGN PATENT DOCUMENTS

| CN | 1800957 A | 7/2006 |
| CN | 101387800 A | 3/2009 |

(Continued)

OTHER PUBLICATIONS

Zhangpeng Liu, the ISA written comments, dated Jul. 2019, CN.

*Primary Examiner* — Thanh Nhan P Nguyen

(57) ABSTRACT

This application discloses a method for manufacturing a display panel and a display panel. The display panel (100) includes: a first substrate (111); a second substrate (112) and a sealant (132), adhering the first substrate (111) and the second substrate (112) in a sealed manner. The first substrate (111) is provided with at, least one metallic wire (120) in a sealant region (130). The sealant region (131) is provided with a depressed portion (141).

17 Claims, 11 Drawing Sheets

(56) References Cited

U.S. PATENT DOCUMENTS

2011/0090445 A1\* 4/2011 Kim .................. G02F 1/1339
349/139

FOREIGN PATENT DOCUMENTS

| CN | 101630078 A | 1/2010 |
| CN | 101699335 A | 4/2010 |
| CN | 101852937 A | 10/2010 |

\* cited by examiner

METHOD FOR MANUFACTURING DISPLAY PANEL AND DISPLAY PANEL

This application claims priority to Chinese Patent Application No. CN201811160561.2, filed with the Chinese Patent Office on Sep. 30, 2018 and entitled "METHOD FOR MANUFACTURING DISPLAY PANEL AND DISPLAY PANEL", which is incorporated herein by reference in its entirety.

TECHNICAL FIELD

This application relates to the field of display technologies, and in particular, to a method for manufacturing a display panel and a display panel.

BACKGROUND

The description herein merely provides background information related to the present invention, and does not necessarily constitute the existing technology.

With development and advancement of science and technologies, due to hot spots such as thinness, power saving, and low radiation, liquid crystal displays become mainstream products of displays and are widely applied. Most liquid crystal displays on the market are backlight liquid crystal displays, including a liquid crystal panel and backlight module. A working principle of the liquid crystal display panel is placing liquid crystal molecules between two parallel glass substrates, and applying a drive voltage to the two glass substrates to control rotation directions of the liquid crystal molecules, so as to refract light of the backlight module to generate a picture.

The two parallel glass substrates of the liquid crystal display panel are adhered and sealed by using a sealant in a non-display region. During use of the display panel, external vapor enters a display region of the display panel and forms bubbles, affecting performance of liquid crystal between the glass substrates, and causing a poor display effect of the display panel.

SUMMARY

This application provides a method for manufacturing a display panel and a display panel that effectively reduce vapor entering a display region.

To achieve the foregoing objective, this application provides a method for manufacturing a display panel, including: providing a first substrate, wherein the first substrate comprises a sealant region; forming a metal layer covering the first substrate; forming a metallic wire in the sealant region through a manufacture procedure using a first mask; laying an insulation layer on the metallic wire; forming at least one depressed portion on the insulation layer through a manufacture procedure using a second mask; and dispensing a sealant in the sealant region, wherein the sealant adheres the first substrate and the second substrate in a sealed manner.

To achieve the foregoing objective, this application further provides a display panel, comprising a display region and a peripheral region, wherein the display panel comprises: a first substrate; a second substrate, arranged opposite to the first substrate; and a sealant, formed in the peripheral region, and adhering the first substrate and the second substrate in a sealed manner, wherein the peripheral region comprises a sealant region dispensed with the sealant, the first substrate is provided with at least one metallic wire in the sealant region, the metallic wire is covered by an insulation layer, the sealant is provided on the insulation layer, and corresponding to the sealant region, the insulation layer is provided with at least one depressed portion.

To achieve the foregoing objective, this application further provides a display panel, comprising a display region and a peripheral region, wherein the display panel comprises: a first substrate; a second substrate, arranged opposite to the first substrate; and a sealant, formed in the peripheral region, and adhering the first substrate and the second substrate in a sealed manner, wherein the peripheral region comprises a sealant region dispensed with the sealant, the first substrate is provided with at least two metallic wires in the sealant region, upper surfaces of the metallic wires are covered by an insulation layer, the sealant is provided on the insulation layer, and corresponding to the sealant region, the insulation layer is provided with a depressed portion; two sides of each of the metallic wires are provided with depressed portions, the width of each of the depressed portion is equal to a distance between two neighboring metallic wires, and the depressed portion is dispensed with the sealant; and bottom faces of the depressed portions are adhered to a surface that is of the first substrate and that is close to the metallic wires. The first metallic wire group may include one metallic wire, or may include multiple metallic wires, and the multiple metallic wires may be formed by hollowing out one metallic wire, or may be formed by multiple metallic wires that are in no communication with each other, or may be formed by hollowing out multiple metallic wires that are in no communication with each other. The depressed portions may be rectangular, trapezoidal, or step-shaped.

The first substrate corresponding to the sealant on the display panel is generally provided with a metallic wire. If the sealant is solidified by being exposed to ultraviolet light on the first substrate, the ultraviolet light irradiates the sealant through the first substrate. This requires that the metallic wire on the first substrate corresponding to the sealant should not be too wide. Otherwise, the sealant covered by the metallic wire cannot be fully solidified, thereby reducing an adhesive force between the sealant and the first substrate, affecting a liquid crystal feature, and reducing a display effect of the display region. For the foregoing defects, the first substrate is provided with several metallic wires in the sealant region, so that the ultraviolet light passes through a gap between the metallic wires to fully solidify the sealant and reinforce the adhesive force between the sealant and the first substrate. However, the metallic wire is covered by the insulation layer. The insulation layer is provided with the sealant. The sealant adheres the entire insulation layer and the first substrate. An adhesive face between the sealant and the insulation layer is a plane. Therefore, vapor easily enters the display region along the adhesive face, thereby reducing the display effect of the display region. In this application, corresponding to the sealant region, the insulation layer is provided with the depressed portion, so that the area of a contact face between the sealant and the insulation layer increases after the sealant region is provided, and a path that is on a tangent plane of the peripheral region and in which external vapor enters the display region becomes longer. Therefore, it is more difficult for the external vapor to enter the display region through edges of the sealant. Bubbles formed by the vapor entering the display region are effectively reduced, thereby improving the display effect of the display panel.

BRIEF DESCRIPTION OF DRAWINGS

The included accompanying drawings are used to provide further understanding to embodiments of this application, form a part of the specification, are examples of implementations of this application, and describe and explain a principle of this application together with this text. Apparently, the following described accompanying drawings are merely some embodiments of this application. A person of ordinary skill in the art may further obtain other accompanying drawings according to these accompanying drawings without making creative efforts. In the accompanying drawings.

DETAILED DESCRIPTION

Specific structures and functional details disclosed herein are merely representative, and are intended to describe the objectives of exemplary embodiments of this application. However, this application may be specifically implemented in many alternative forms, and should not be construed as being limited to the embodiments set forth herein.

This application is further described below with reference to the accompanying drawings and embodiments.

Figure 1:
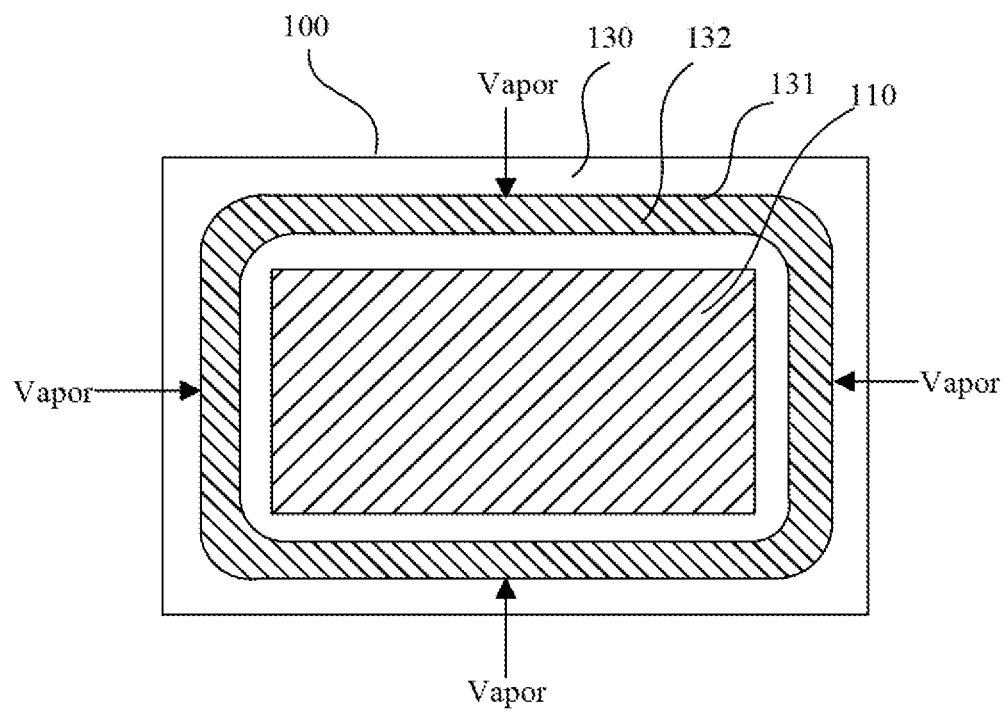
FIG. 1 is a schematic diagram of a display panel according to an embodiment of this application.
Figure 2:
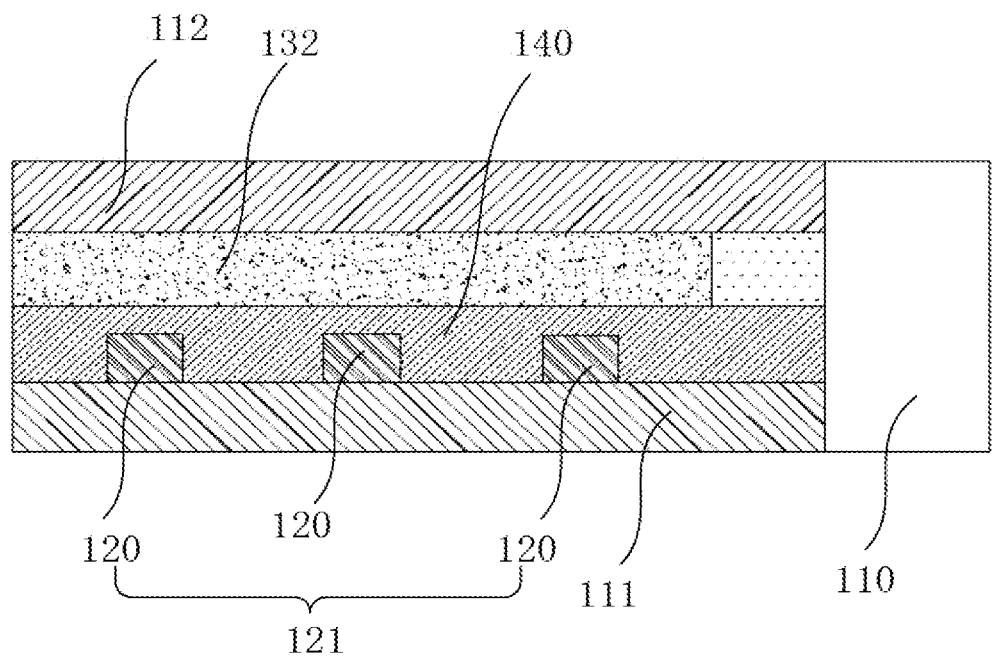
FIG. 2 is a schematic cross-sectional view of a display panel according to an embodiment of this application.

Liquid crystal displays (LCD) are widely applied due to many advantages such as thinness, power saving, and no radiation. For example, the liquid crystal display is applied to a personal digital assistant, a digital camera, a computer screen, or a notebook computer screen. However, as shown in FIG. 1 and FIG. 2, vapor easily enters a display region 110 of the liquid crystal display panel 100, causing a decrease of a display effect. If the sealant 132 is not well adhered to a substrate, the vapor enters the display region 110 from edges of the sealant 132, thereby decreasing the display effect of the display region 110. In a general product design, there is a metal wiring design on the sealant 132. If the sealant 132 is solidified by being exposed to ultraviolet light irradiating from sides of an array substrate. The ultraviolet light irradiates the sealant 132 through the array substrate. A light shielding metal above the sealant should be designed with a small width. Otherwise, the sealant 132 below the metal cannot be fully solidified, thereby affecting a liquid crystal feature. Therefore, the light shielding metal above the sealant 132 is usually used to for a design of spaced metallic wires 120. A design is provided in this application, to resolve the problem that the display effect decreases because bubbles easily enter the display region 110 of the liquid crystal display panel 100.

Figure 3:
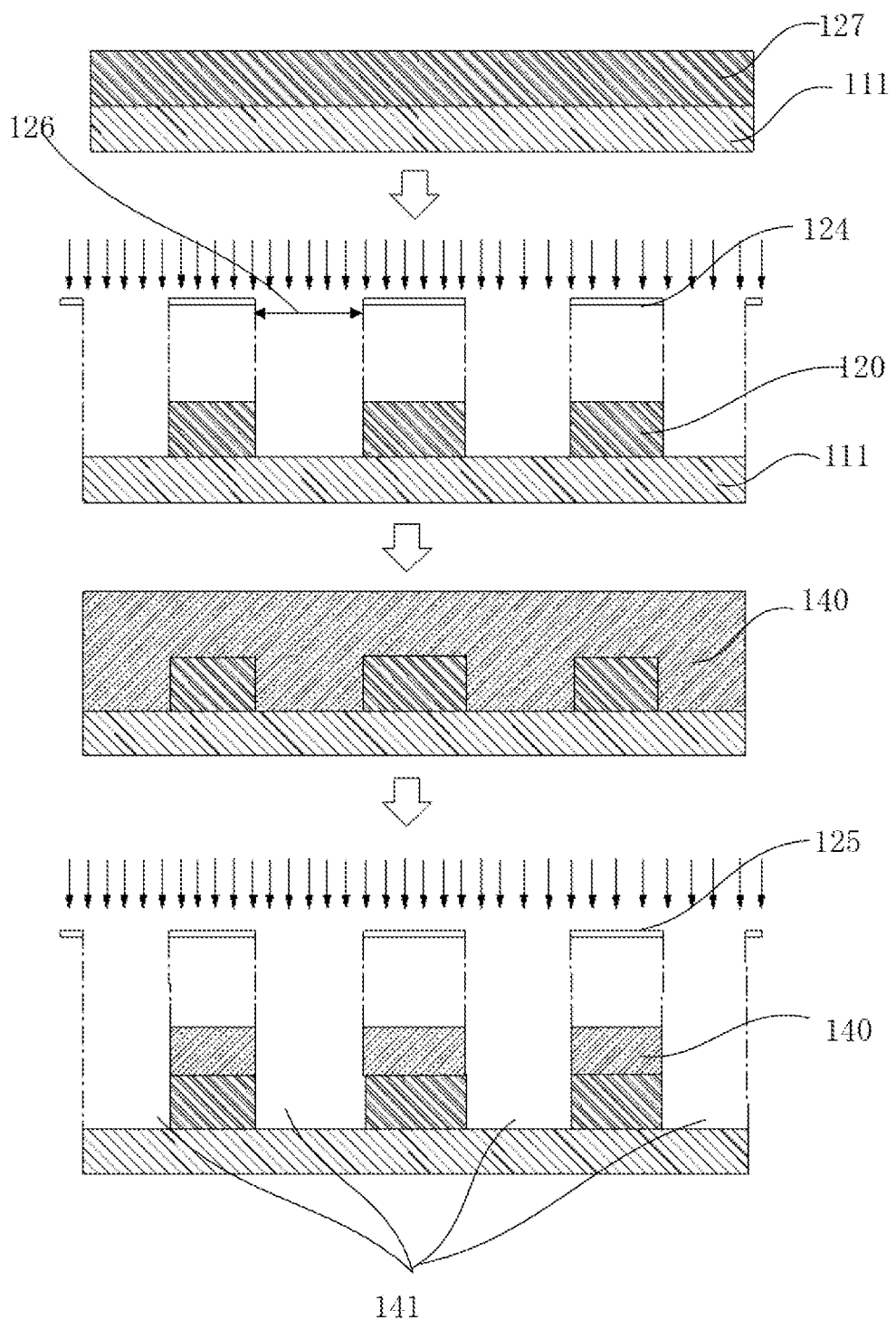
FIG. 3 is a schematic diagram of a manufacture procedure of a display panel according to an embodiment of this application.
Figure 16:
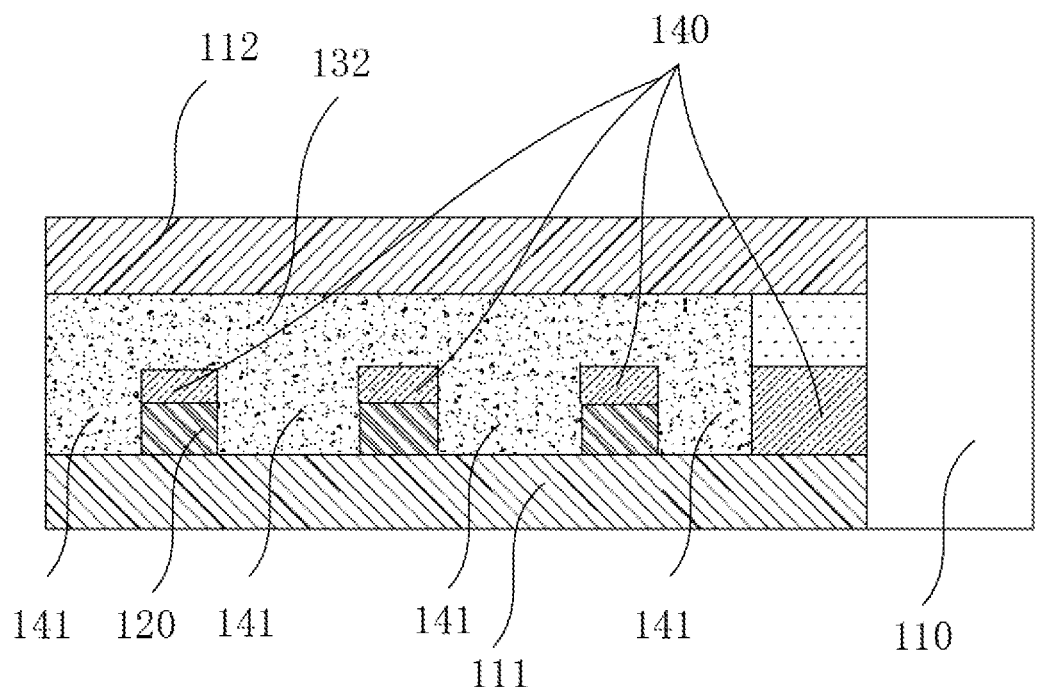
FIG. 16 is a schematic cross-sectional view of another display panel according to an embodiment of this application.

As shown in FIG. 3 and FIG. 16, in an embodiment of this application, a method for manufacturing a display panel 100 is disclosed. The method includes: providing a first substrate 111, where the first substrate 111 includes a sealant region 131; forming a metal layer 127 covering the first substrate 111; forming a metallic wire 120 in the sealant region 131 through a manufacture procedure using a first mask 124; laying an insulation layer 140 on the metallic wire 120; forming at least one depressed portion 141 on the insulation layer 140 through a manufacture procedure using a second mask 125; and dispensing a sealant 132 in the sealant region 131, where the sealant 132 adheres the first substrate 111 and the second substrate 112 in a sealed manner. Specifically, the first substrate 111 is an array substrate, the second substrate 112 is a color filter substrate, and the second substrate is dispensed with the sealant 132. In the method for manufacturing a display panel 100 in this application, an etching process of the insulation layer 140 is added based on an original manufacture procedure to obtain the depressed portion 141. This does not affect other manufacture procedures, and machines of other manufacture procedures do not need to be reconfigured. Therefore, the operation is convenient, and costs are reduced.

In an embodiment, the second mask 125 includes an opening 126. The opening 126 is arranged corresponding to the depressed portion 141. The width of the opening 126 is equal to the width of the depressed portion 141. The opening 126 of the second mask 125 is arranged corresponding to the depressed portion 141. The depressed portion 141 is formed after the insulation layer 140 is laid. The insulation layer 140 needs to be selectively etched. The insulation layer 140 corresponding to the opening 126 is etched to form the depressed portion 141. Therefore, each depressed portion 141 is correspondingly provided with a opening 126. Moreover, the width of the opening 126 is equal to the width of the depressed portion 141.

In another embodiment of this application, as shown in FIG. 4 to FIG. 9, a display panel 100 is disclosed. The display panel 100 includes a display region 110 and a peripheral region 130. The display panel 100 includes: a first substrate 111; a second substrate 112, arranged opposite to the first substrate 111; and a sealant 132, formed on the peripheral region 130, and adhering the first substrate 111 and the second substrate 112 in a sealed manner. The peripheral region 130 includes a sealant region 131 dispensed with the sealant 132. The first substrate 111 is provided with at least one metallic wire 120 in the sealant region 131. The metallic wire 120 is covered by the insulation layer 140. The sealant 132 is provided on the insulation layer 140. Corresponding to the sealant region 131, the insulation layer 140 is provided with at least one depressed portion 141.

Specifically, the first substrate 111 is an array substrate. The second substrate 112 is a color filter substrate. The metallic wire 120 may be formed by hollowing out one metallic wire, or may be metallic wires that are in no communication with each other.

The first substrate 111 corresponding to the sealant 132 on the display panel 100 is generally provided with the metallic wire 120. The metallic wire 120 is covered by the insulation layer 140. The insulation layer 140 is provided with the sealant 132. The sealant 132 adheres the entire insulation layer 140 and the first substrate 111. An adhesive face between the sealant 132 and the insulation layer 140 is a plane. Therefore, vapor easily enters the display region 110 along the adhesive face, thereby reducing the display effect of the display region 110. In this application, corresponding to the sealant region 131, the insulation layer 140 is provided with the depressed portion 141, so that the area of a contact face between the sealant 132 and the insulation layer 140 increases after the sealant region 131 is provided, and a path that is on a tangent plane of the peripheral region 130 and in which external vapor enters the display region 110 becomes longer. Therefore, it is more difficult for the external vapor to enter the display region 110 through edges of the sealant 132. Bubbles formed by the vapor entering the display region 110 are effectively reduced, thereby improving the display effect of the display panel 100.

In an embodiment, at least one metallic wire 120 forms a first metallic wire group 121. For example, the first metallic wire group 121 consists of one metallic wire 120. Two sides of each first metallic wire group 121 are provided with depressed portions 141. At least two depressed portions 141 are dispensed with the sealant 132. Specifically, the insulation layer 140 may cover and merely cover an upper surface 122 of the metallic wire 120, or may cover an upper surface 122 and two side faces 123 of the metallic wire 120. The first metallic wire group 121 consists of one metallic wire 120. Two sides of each first metallic wire group 121 are provided with depressed portions 141. The sealant 132 is dispensed in two depressed portions 141, so that an actual contact face between the sealant 132 and the first substrate 111 includes a concave-convex face. The area of the contact face between the sealant 132 and the insulation layer 140 increases after the sealant region 131 is provided, and the path that is on the tangent plane of the peripheral region and in which the vapor enters the display region 110 becomes longer. This design increases the difficulty of entering the display region 110 by the vapor through the edges of the sealant 132, and reduces the bubbles formed by the vapor entering the display region 110.

In an embodiment, bottom faces of the depressed portions 141 are adhered to a surface of one side that is of the first substrate 111 and that is close to the sealant 132. The bottom faces of the depressed portions 141 are adhered to the first substrate 111. The sealant 132 dispensed in the depressed portions 141 directly adheres to the first substrate 111. Ultraviolet light irradiates the sealant 132 in the depressed portions 141 through the first substrate 111 without shielding, so that a solidification effect of the sealant 132 is good, thereby increasing an adhesive force between the sealant 132 and the first substrate 111, and reducing the bubbles formed by the vapor entering the display region 110.

Figure 7:
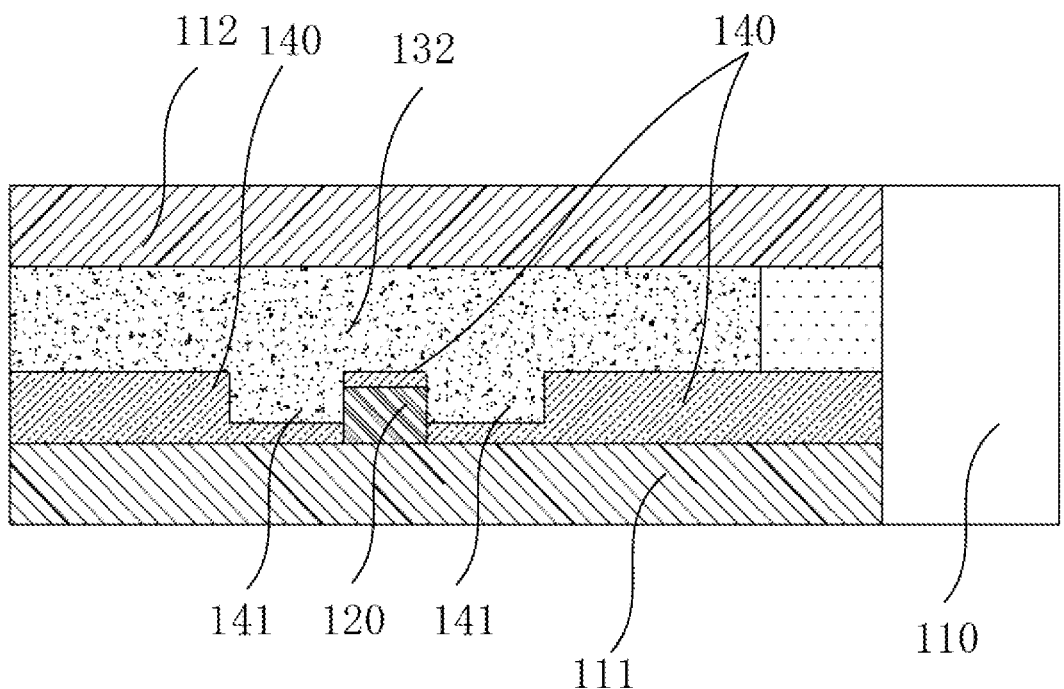
FIG. 7 is a schematic cross-sectional view of another display panel according to an embodiment of this application.
Figure 8:
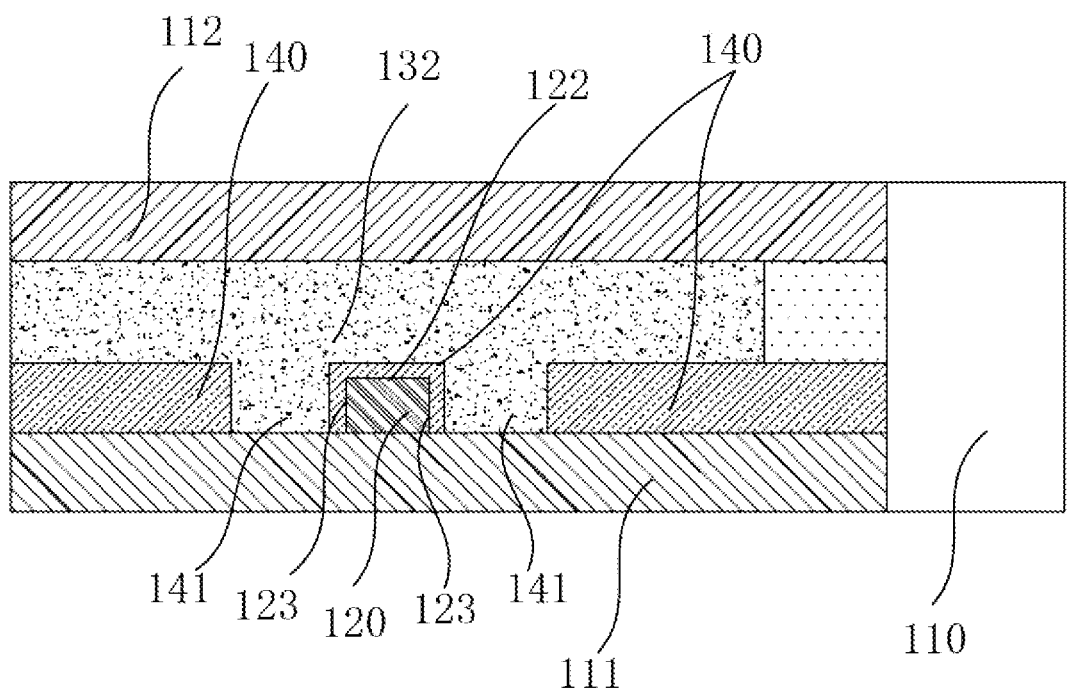
FIG. 8 is a schematic cross-sectional view of a display panel including rectangular depressed portions according to an embodiment of this application.
Figure 9:
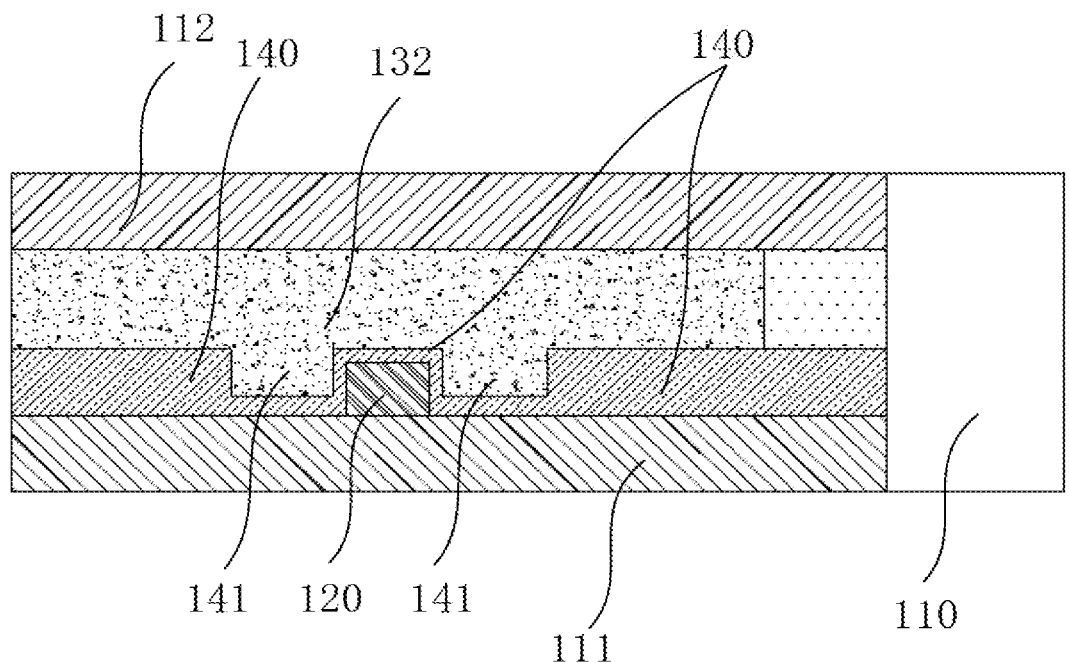
FIG. 9 is a schematic cross-sectional view of another display panel including rectangular depressed portions according to an embodiment of this application.
Figure 10:
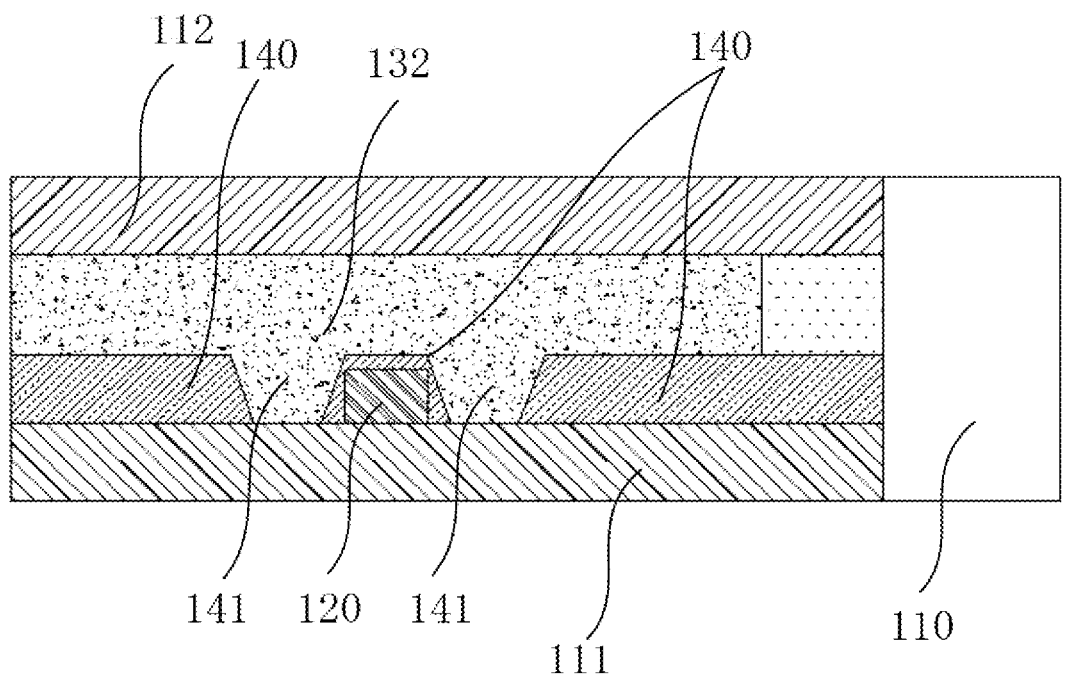
FIG. 10 is a schematic cross-sectional view of a display panel including trapezoidal depressed portions according to an embodiment of this application.
Figure 11:
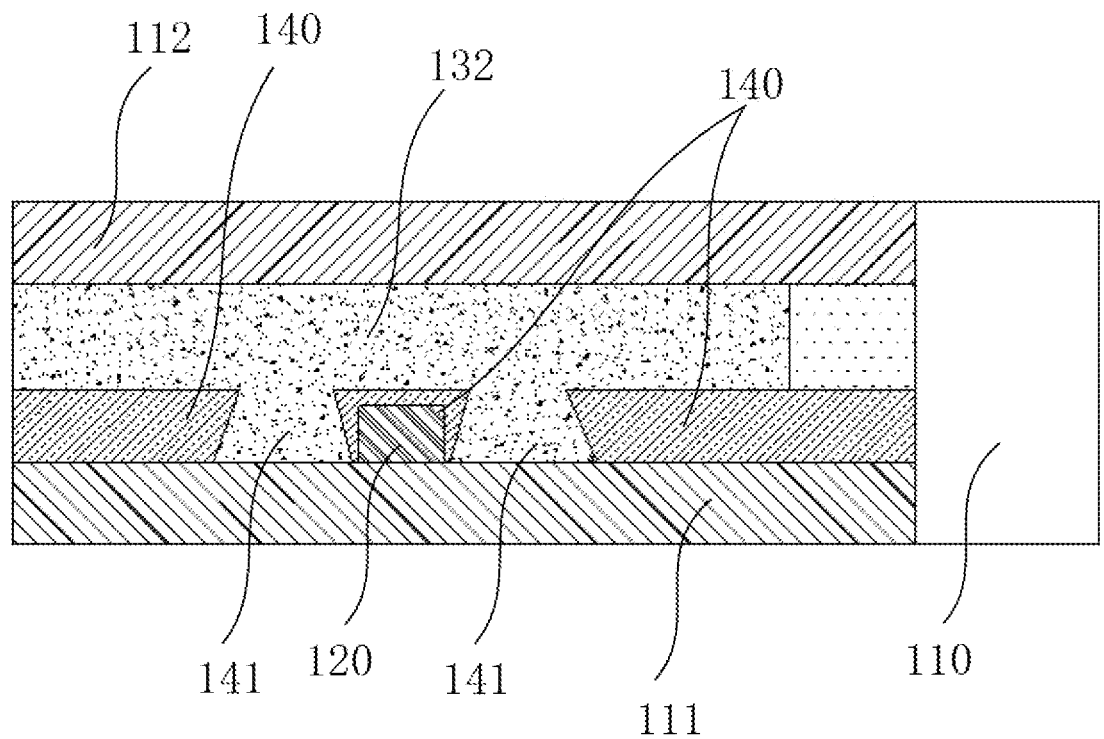
FIG. 11 is a schematic cross-sectional view of a display panel including trapezoidal depressed portions according to an embodiment of this application.
Figure 12:
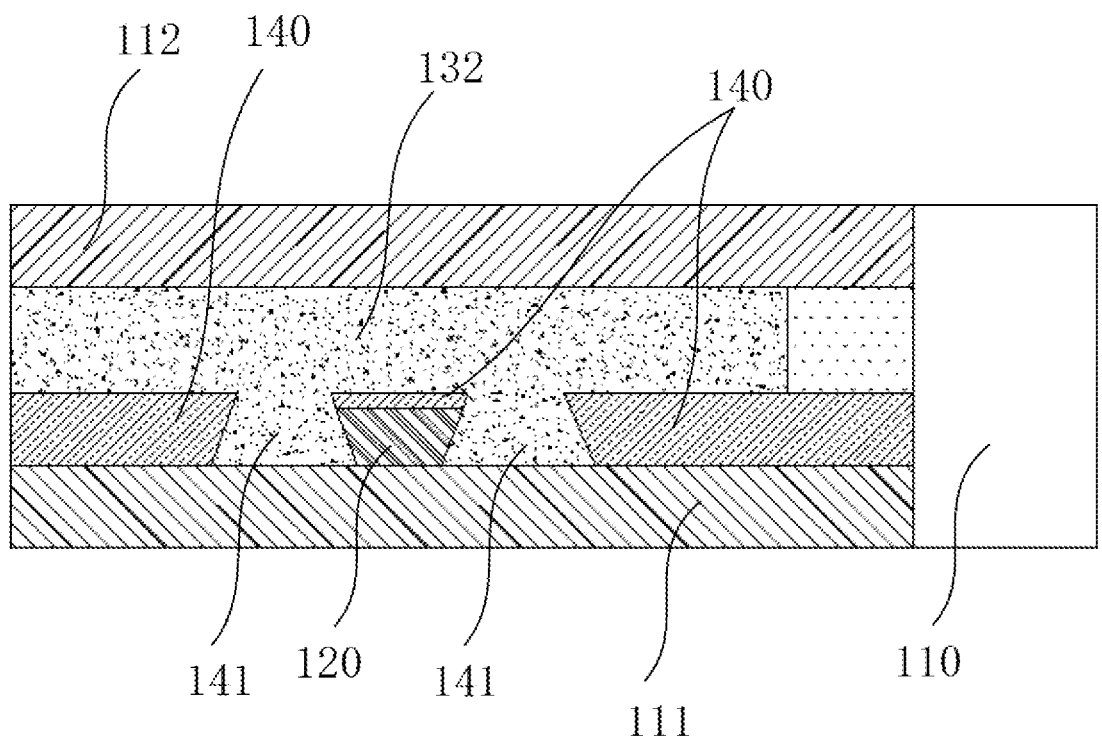
FIG. 12 is a top view of a sealant region according to an embodiment of this application.
Figure 13:
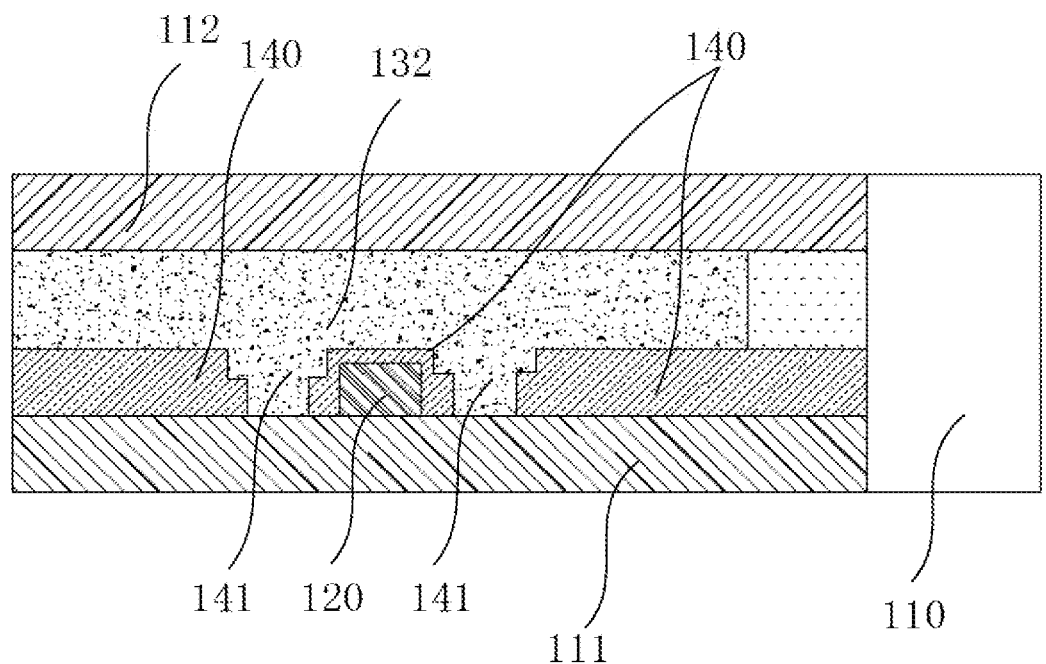
FIG. 13 is a top view of another sealant region according to an embodiment of this application.

Referring to FIG. 7 and FIG. 9, different from the foregoing embodiment, the insulation layer 140 is included between the depressed portion 141 and the first substrate 111, and the thickness of the insulation layer 140 below the depressed portion 141 is less than the height of the metallic wire 120. In a manufacture procedure of the display panel 100, the entire insulation layer 140 is laid flat on the metallic wire 120, and then, the insulation layer 140 is etched to form the depressed portion 141. If only a part of the insulation layer 140 in a region corresponding to the depressed portion 141 is etched, the insulation layer 140 is between the depressed portion 141 and the first substrate 111. A surface of the part of the insulation layer 140 becomes rough. After the sealant 132 is dispensed, a contact face between the sealant 132 and the insulation layer 140 increases, and therefore, an adhesive force also increases. Moreover, the thickness of the insulation layer 140 below the depressed portion 141 is less than the height of the metallic wire 120, so that an adhesive face between the sealant 132 and the first substrate 111 is a concave-convex face. Therefore, it is more difficult for vapor to enter the display region 110, thereby effectively reducing bubbles formed by the vapor entering the display region 110.

In an embodiment, referring to FIG. 10 to FIG. 13, the depressed portion 141 may be trapezoidal or step-shaped in addition to rectangular. There are two cases if the depressed portion 141 is trapezoidal: a trapezoidal depressed portion 141 with a wide top and a narrow bottom and a trapezoidal depressed portion 141 with a narrow top and a wide bottom. When the metallic wire 120 is of a shape with a wide top and a narrow bottom after the metallic wire 120 is hollowed out, depressed portions 141 on two sides of the metallic wire 120 are of a shape with a narrow top and a wide bottom. Trapezoidal or step-shaped depressed portions 141 may increase a contact area between the sealant 132 and the insulation layer 140, and therefore increases an adhesive force of the sealant 132, so that an adhesive face between the sealant 132 and the first substrate 111 increases. Therefore, it is more difficult for the vapor to enter the display region 110, thereby effectively reducing bubbles formed by vapor entering the display region 110. Particularly, when the depressed portion 141 is of a shape with a narrow top and a wide bottom, the sealant 132 is covered in the depressed portion 141. In this case, the sealant 132 is adhered to the metallic wire 120 in the depressed portion 141, thereby increasing an adhesive force between the sealant 132 and the metallic wire 120. The vapor is more effectively prevented from entering the display region 110.

Figure 14:
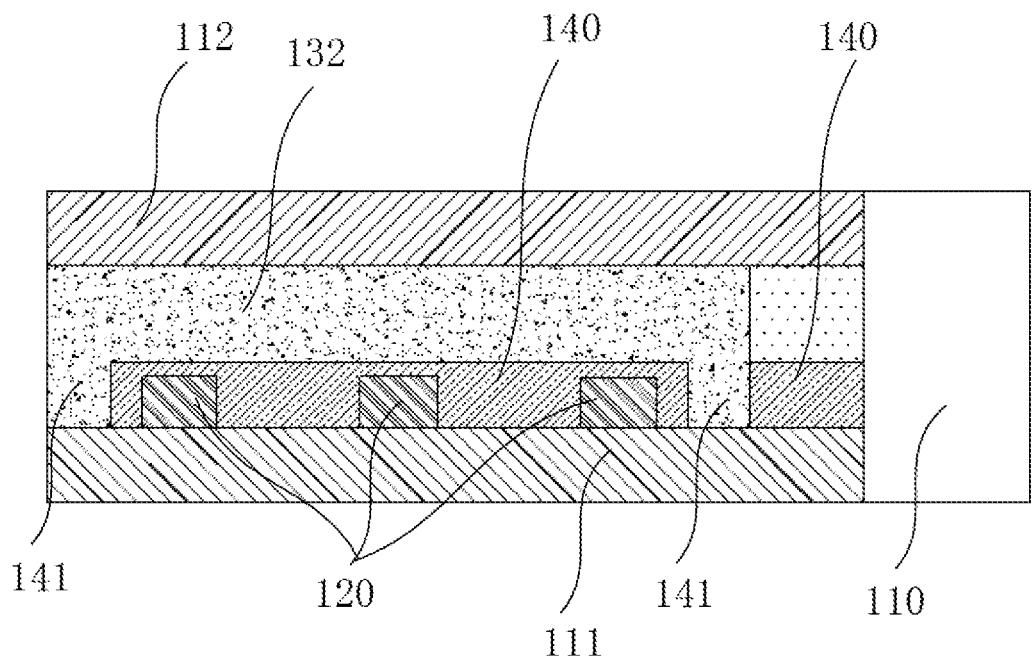
FIG. 14 is a schematic cross-sectional view of another display panel according to an embodiment of this application.

In another embodiment of this application, referring to FIG. 14, different from the foregoing embodiment, the first metallic wire group 121 includes at least two metallic wires 120. For example, the first metallic wire group 121 consists of three metallic wires 120 spaced away from each other. Two sides of the first metallic wire group 121 are provided with depressed portions 141. The insulation layer 140 is arranged between two neighboring metallic wires 120 in the first metallic wire group 121. The height of the insulation layer 140 is equal to the height between the insulation layer 140 covering the metallic wires 120 and the first substrate 111. The sealant 132 completely covers the first metallic wire group 121 and is provided in the depressed portions 141 on the two sides.

The first substrate 111 corresponding to the sealant 132 on a display panel 100 is generally provided with the metallic wire 120. If the sealant 132 is solidified by being exposed to ultraviolet light on the first substrate 111, the ultraviolet light irradiates the sealant 132 through the first substrate 111. This requires that the metallic wire 120 on the first substrate 111 corresponding to the sealant 132 should not be too wide. Otherwise, the sealant 132 covered by the metallic wire 120 cannot fully solidified, thereby reducing an adhesive force between the sealant 132 and the first substrate 111, affecting a liquid crystal feature, and reducing a display effect of a display region 110. For the foregoing defects, when the width of the metallic wire 120 in the first substrate 111 in the sealant region 131 is too wide, the metallic wire 120 is hollowed out to form at least two metallic wires 120, so that ultraviolet light passes through a gap between the metallic wires 120 to fully solidify the sealant 132 and reinforce the adhesive force between the sealant 132 and the first substrate 111. However, the metallic wires 120 are covered by the insulation layer 140. The insulation layer 140 is provided with the sealant 132. The sealant 132 adheres the entire insulation layer 140 and the first substrate 111. An adhesive face between the sealant 132 and the insulation layer 140 is a plane. Therefore, vapor easily enters the display region 110 along the adhesive face, thereby reducing the display effect of the display region 110.

The first metallic wire group 121 in this embodiment consists of three metallic wires 120, and does not affect solidification of the sealant 132. Based thereupon, on one hand, the insulation layer 140 completely covers the metallic wires 120, and prevents the metallic wires 120 from being corroded by the vapor. On the other hand, the two sides of the first metallic wire group 121 are provided with the depressed portions 141. The sealant 132 completely covers the first metallic wire group 121 and is provided in the depressed portions 141 on the two sides, so that an actual contact face between the sealant 132 and the first metallic wire group 121 is a concave-convex face. Therefore, it is more difficult for the vapor to enter the display region 110 through edges of the sealant 132, thereby reducing bubbles formed by the vapor entering the display region 110.

In an embodiment, bottom faces of the depressed portions 141 are adhered to a surface of one side that is of the first substrate 111 and that is close to the sealant 132. The bottom faces of the depressed portions 141 are adhered to the first substrate 111. The sealant 132 dispensed in the depressed portions 141 directly adheres to the first substrate 111. Ultraviolet light irradiates the sealant 132 in the depressed portions 141 through the first substrate 111 without shielding, so that a solidification effect of the sealant 132 is good, thereby increasing an adhesive force between the sealant 132 and the first substrate 111, and reducing the bubbles formed by the vapor entering the display region 110.

Figure 15:
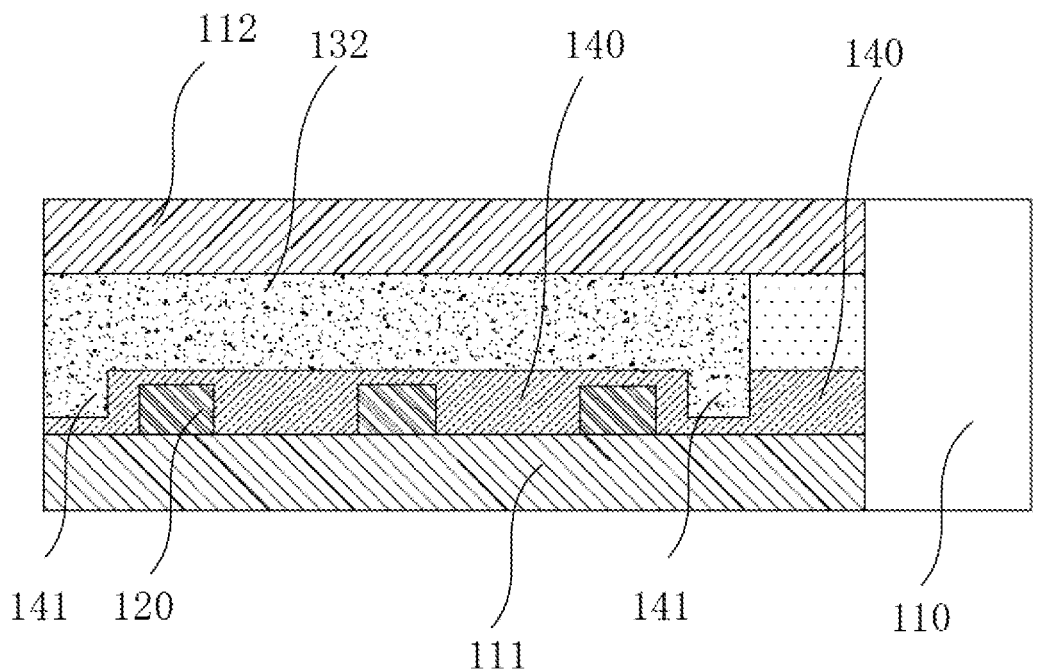
FIG. 15 is a schematic cross-sectional view of another display panel according to an embodiment of this application.

Referring to FIG. 15, different from the foregoing embodiment, the insulation layer 140 is included between the depressed portion 141 and the first substrate 111, and the thickness of the insulation layer 140 below the depressed portion 141 is less than the height of the metallic wire 120.

In a manufacture procedure of the display panel 100, the entire insulation layer 140 is laid flat on the metallic wire 120, and then, the insulation layer 140 is etched to form the depressed portion 141. If only a part of the insulation layer 140 in a region corresponding to the depressed portion 141 is etched, the insulation layer 140 is between the depressed portion 141 and the first substrate 111. A surface of the part of the insulation layer 140 becomes rough. After the sealant 132 is dispensed, a contact face between the sealant 132 and the insulation layer 140 increases, and therefore, an adhesive force also increases. Moreover, the thickness of the insulation layer 140 below the depressed portion 141 is less than the height of the metallic wire 120, so that an adhesive face between the sealant 132 and the first substrate 111 is a concave-convex face. Therefore, it is more difficult for vapor to enter the display region 110, thereby effectively reducing bubbles formed by the vapor entering the display region 110.

In another embodiment of this application, referring to FIG. 16, different from the foregoing embodiment, the metallic wire 120 includes at least two metallic wires 120, for example, three metallic wires 120 spaced away from each other. The insulation layer 140 covers and merely covers upper surfaces 122 of the metallic wires 120. Two sides of each of the metallic wires 120 are provided with depressed portions 141. The width of each of the depressed portions 141 is equal to a distance between two neighboring metallic wires 120. The depressed portions 141 are dispensed with the sealant 132. The upper surface 122 of each of the metallic wires 120 is covered by the insulation layer 140. Two sides of each of the metallic wires 120 are provided with the depressed portions 141, and the width of each of the depressed portion 141 is equal to a distance between two neighboring metallic wires 120. The depressed portion 141 is dispensed with the sealant 132, so that a contact face between the sealant 132 and the first substrate 111 is set to be multiple consecutive concave-convex faces while ensuring an adhesive force between the two, the area of the contact face between the sealant 132 and the insulation layer 140 increases after the sealant region 131 is provided, and the path that is on a tangent plane of a peripheral region 130 and in which the vapor enters a display region 110 becomes longer, thereby effectively reducing bubbles formed by the vapor entering the display region 110.

In an embodiment, bottom faces of the depressed portions 141 are adhered to a surface of one side that is of the first substrate 111 and that is close to the sealant 132. The bottom faces of the depressed portions 141 are adhered to the first substrate 111. The sealant 132 dispensed in the depressed portions 141 directly adheres to the first substrate 111. Ultraviolet light irradiates the sealant 132 in the depressed portions 141 through the first substrate 111 without shielding, so that a solidification effect of the sealant 132 is good, thereby increasing an adhesive force between the sealant 132 and the first substrate 111, and reducing the bubbles formed by the vapor entering the display region 110.

Figure 17:
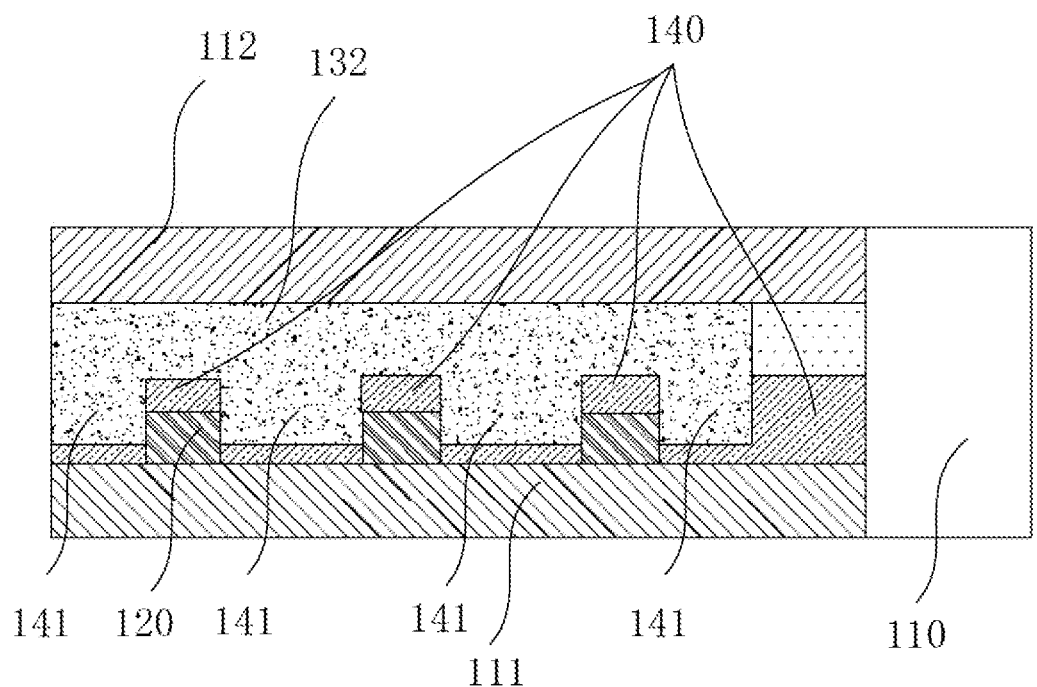
FIG. 17 is a schematic cross-sectional view of another display panel according to an embodiment of this application.

Referring to FIG. 17, different from the foregoing embodiment, the insulation layer 140 is included between the depressed portion 141 and the first substrate 111, and the thickness of the insulation layer 140 below the depressed portion 141 is less than the height of the metallic wire 120.

In a manufacture procedure of the display panel 100, the entire insulation layer 140 is laid flat on the metallic wire 120, and then, the insulation layer 140 is etched to form the depressed portion 141. If only a part of the insulation layer 140 in a region corresponding to the depressed portion 141 is etched, the insulation layer 140 is between the depressed portion 141 and the first substrate 111. A surface of the part of insulation layer 140 becomes rough. After the sealant 132 is dispensed, a contact face between the sealant 132 and the insulation layer 140 increases, and therefore, an adhesive force also increases. Moreover, the thickness of the insulation layer 140 below the depressed portion 141 is less than the height of the metallic wire 120, so that an adhesive face between the sealant 132 and the first substrate 111 is a concave-convex face. Therefore, it is more difficult for vapor to enter the display region 110, thereby effectively reducing bubbles formed by the vapor entering the display region 110.

Figure 18:
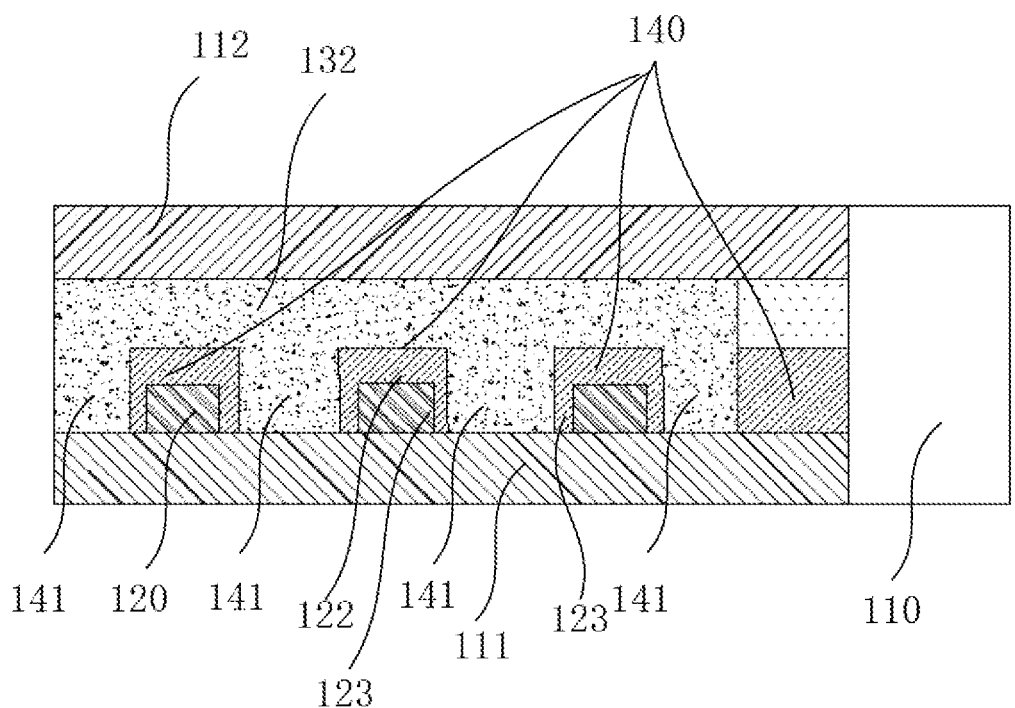
FIG. 18 is a schematic cross-sectional view of another display panel according to an embodiment of this application.
Figure 19:
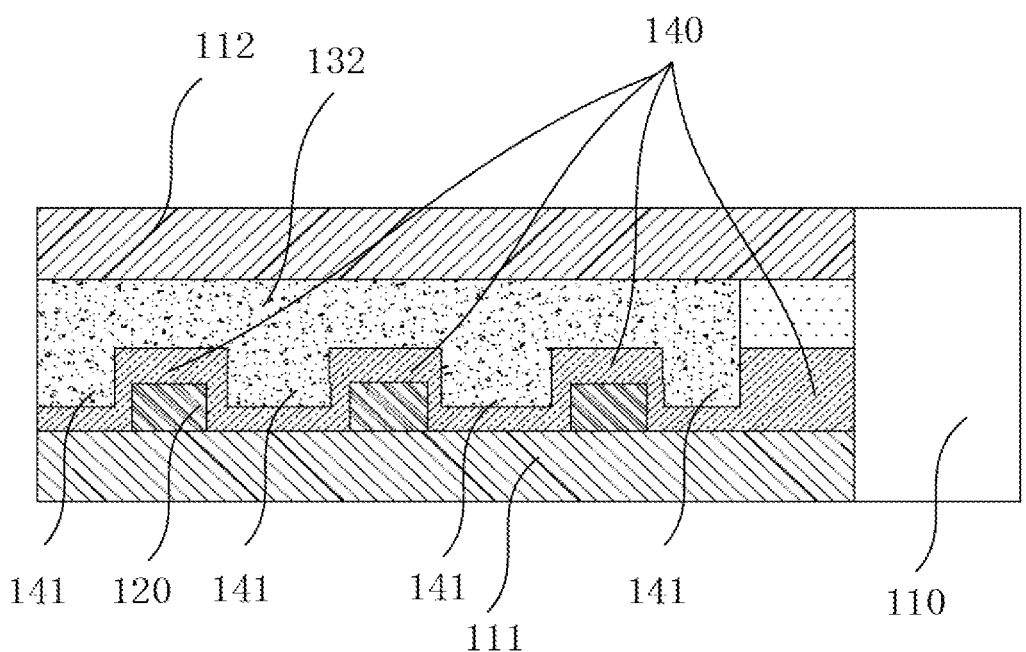
FIG. 19 is a schematic cross-sectional view of another display panel according to an embodiment of this application.

In another embodiment of this application, referring to FIG. 18 and FIG. 19, different from the foregoing embodiment, the metallic wire 120 includes at least two metallic wires 120, for example, three metallic wires 120 spaced away from each other. The insulation layer 140 covers and merely covers upper surfaces 122 and two side faces 123 of the metallic wires 120. The insulation layer 140 is respectively closely adhered to the upper surfaces 122 and the two side faces 123 of the metallic wires 120. Two sides of each of the metallic wires 120 are provided with depressed portions 141. The width of each of the depressed portions 141 is less than a distance between two neighboring metallic wires 120. The depressed portions 141 are dispensed with the sealant 132.

The upper surface 122 and the two sides of each of the metallic wires 120 are closely covered by the insulation layer 140. The insulation layer 140 protects all sides of the metallic wires 120 except the side adhered to the first substrate 111, thereby effectively preventing vapor from corroding the metallic wires 120. Based thereupon, the two sides of each of the metallic wires 120 are provided with the depressed portions 141. Because the two side faces 123 of each of the metallic wires 120 are provided with the insulation layer 140, the width of each of the depressed portions 141 is less than the distance between two neighboring metallic wires 120. The depressed portions 141 are dispensed with the sealant 132, so that an actual contact face between the sealant 132 and the first substrate 111 is multiple consecutive concave-convex faces, the area of the contact face between the sealant 132 and the insulation layer 140 increases, and the path that is on a tangent plane of a peripheral region 130 and in which vapor enters a display region 110 becomes longer, thereby effectively reducing bubbles formed by the vapor entering the display region 110.

Figure 4:
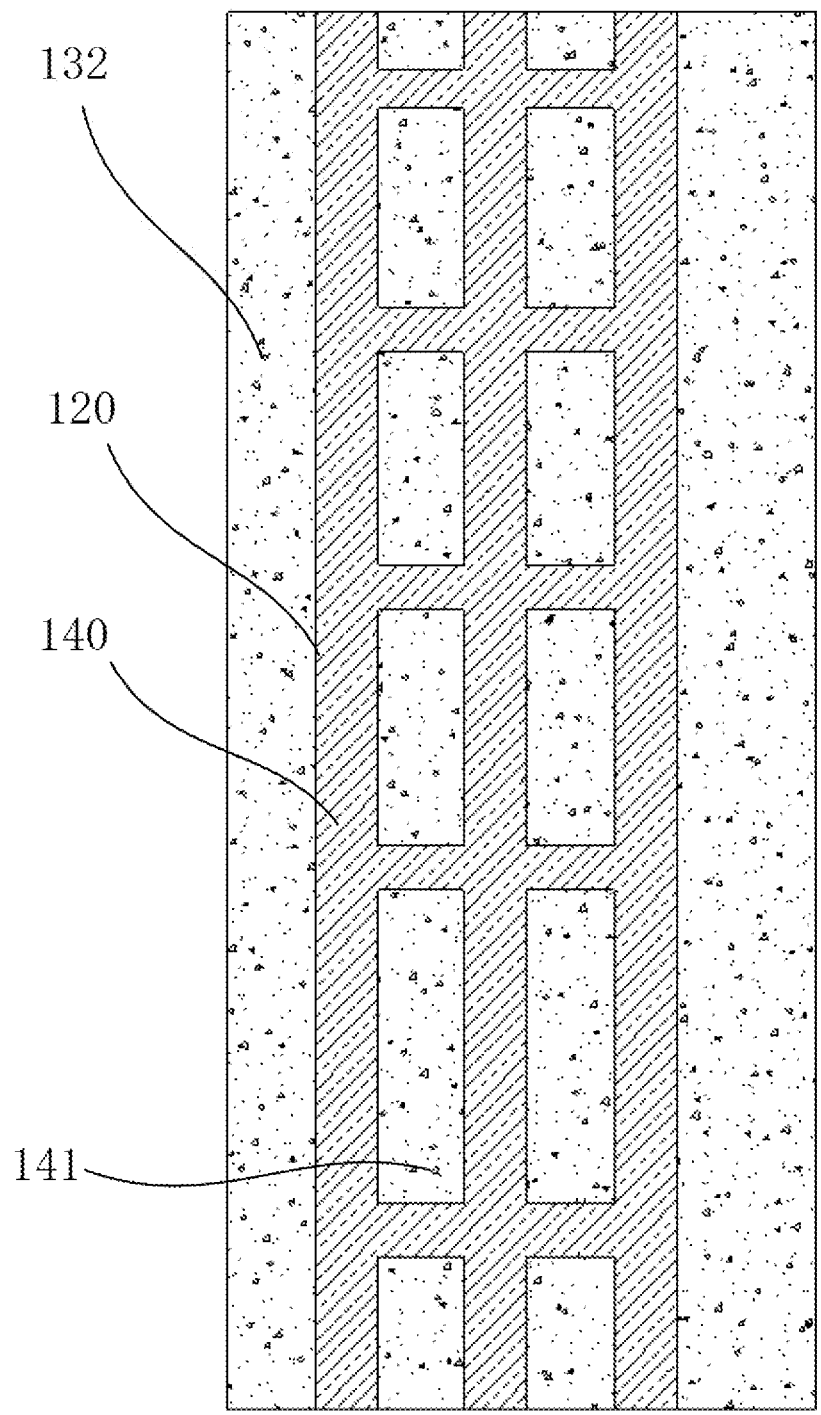
FIG. 4 is a cross-sectional view of another display panel according to an embodiment of this application.
Figure 5:
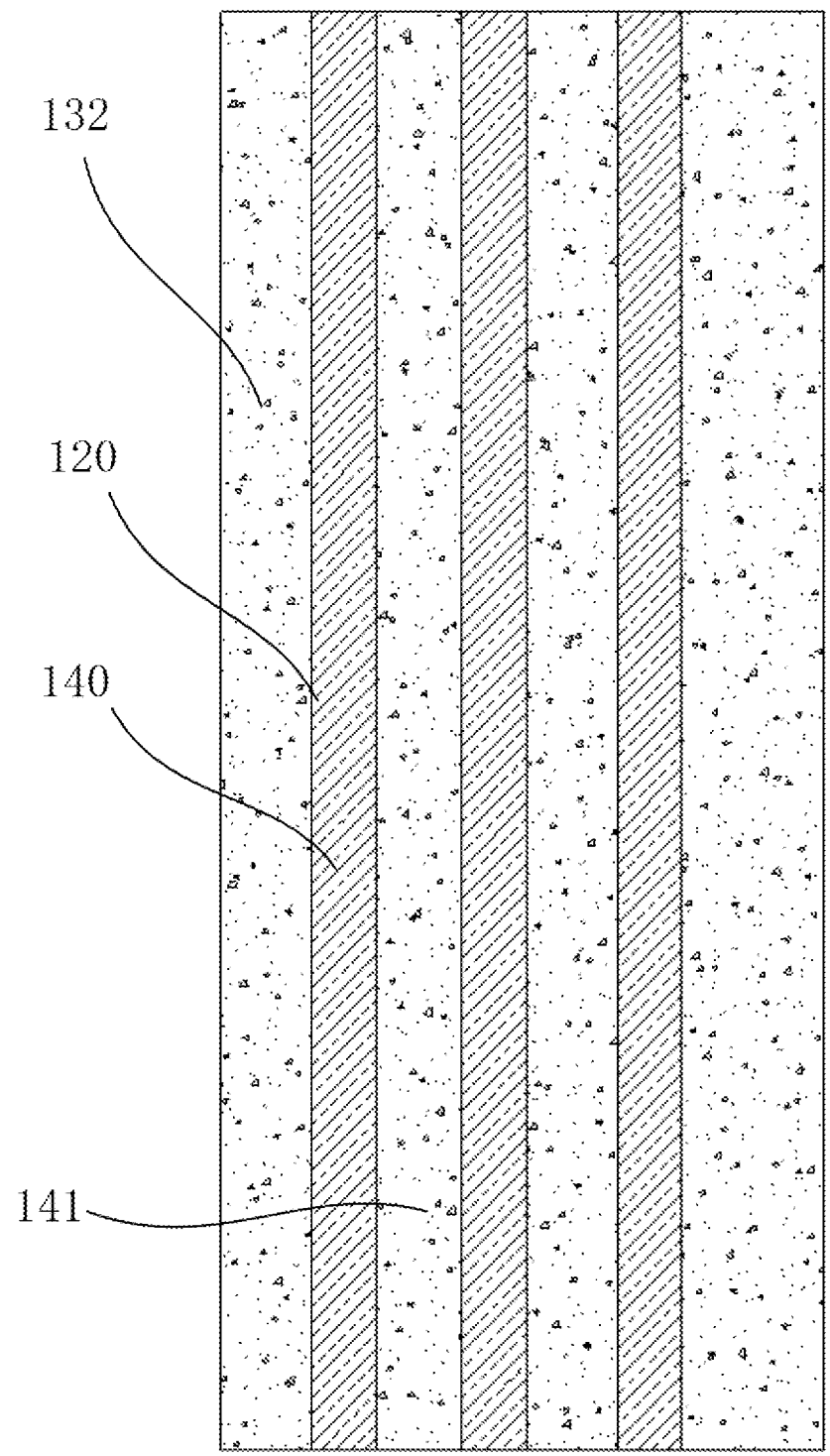
FIG. 5 is a schematic cross-sectional view of another display panel according to an embodiment of this application.
Figure 6:
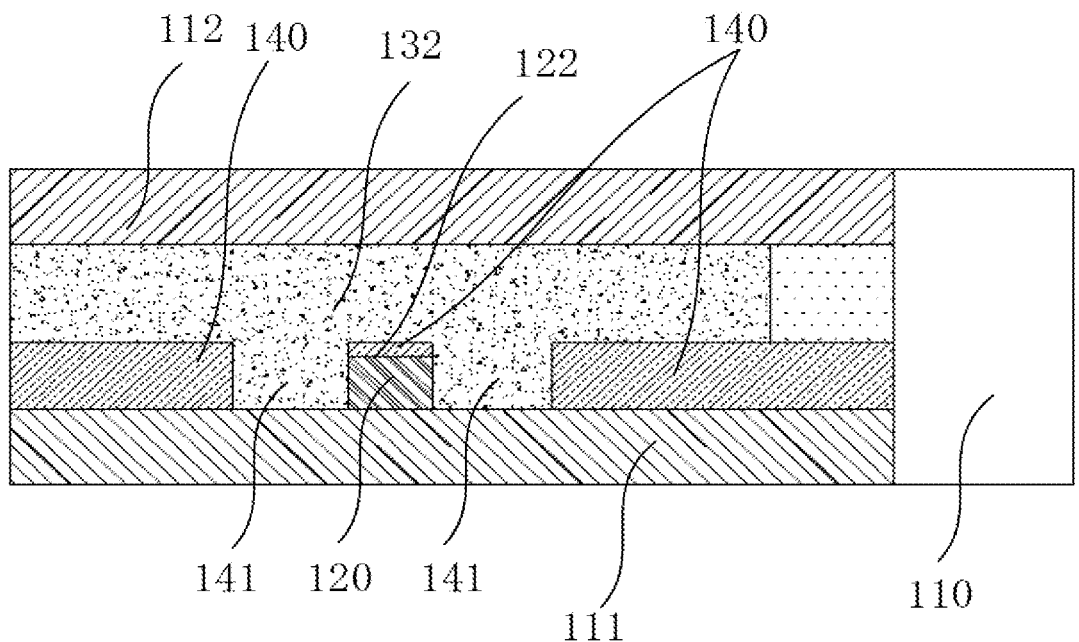
FIG. 6 is a schematic cross-sectional view of another display panel according to an embodiment of this application.

In another embodiment of this application, as shown in FIG. 4, FIG. 5, and FIG. 16, a display panel 100 is disclosed. The display panel 100 includes a display region 110 and a peripheral region 130. The display panel 100 includes: a first substrate 111; a second substrate 112, arranged opposite to the first substrate 111; and a sealant 132, formed in the peripheral region 130, and adhering the first substrate 111 and the second substrate 112 in a sealed manner. The peripheral region 130 includes a sealant region 131 dispensed with the sealant 132. The first substrate 111 is provided with at least two metallic wires 120 in the sealant region 131, for example, three metallic wires 120 spaced away from each other. Upper surfaces 122 of the metallic wires 120 are covered by an insulation layer 140. The sealant 132 is provided on the insulation layer 140. The sealant region 131 corresponding to the insulation layer 140 is provided with a depressed portion 141. Two sides of each of the metallic wires 120 are provided with the depressed portions 141. The width of each of the depressed portions 141 is equal to a distance between two neighboring metallic wires 120. The depressed portions 141 are dispensed with the sealant 132. Bottom faces of the depressed portions 141 are adhered to a surface that is of the first substrate 111 and that is close to the metallic wires 120.

Specifically, the first substrate 111 is an array substrate. The second substrate 112 is a color filter substrate. The metallic wire 120 may be formed by hollowing out one metallic wire, or may be formed by metallic wires that are in no communication with each other.

The sealant region 131 is provided with at least two metallic wires 120. The metallic wires 120 are scattered, to avoid affecting solidification of the sealant 132 due to the excessively wide width of the metallic wires 120. An upper surface 122 of each of the metallic wires 120 is covered by the insulation layer 140. Two sides of each of the metallic wires 120 are provided with depressed portions 141. The depressed portions 141 are dispensed with the sealant 132, so that a contact face between the sealant 132 and the first substrate 111 includes at least two consecutive concave-convex faces. Therefore, the area of the contact face between the sealant 132 and the insulation layer 140 increases, and the path that is on a tangent plane of the peripheral region 130 in which vapor enters the display region 110 becomes longer. In addition, the width of each of the depressed portions 141 is equal to the distance between two neighboring metallic wires 120. Bottom faces of the depressed portions 141 are adhered to a surface that is of the first substrate 111 and that is close to the metallic wire 120. The sealant 132 dispensed in the depressed portions 141 directly adheres to the first substrate 111. Ultraviolet light irradiates the sealant 132 in the depressed portion 141 through the first substrate 111 without shielding, so that a solidification effect of the sealant 132 is good, thereby increasing an adhesive force between the sealant 132 and the first substrate 111. In conclusion, this design effectively reduces bubbles formed by the vapor entering the display region 110.

In another embodiment of this application, as shown in FIG. 4 and FIG. 16, a display panel 100 is disclosed. The display panel 100 includes a display region 110 and a peripheral region 130. The display panel 100 includes: a first substrate 111; a second substrate 112, arranged opposite to the first substrate 111; and a sealant 132, formed in the peripheral region 130, and adhering the first substrate 111 and the second substrate 112 in a sealed manner. The peripheral region 130 includes a sealant region 131 dispensed with the sealant 132. The first substrate 111 is provided with at least one metallic wire 120 in the sealant region 131. One metallic wire 120 is hollowed out to form mesh-like metallic wires. Upper surfaces 122 of the mesh-like metallic wires are covered by an insulation layer 140. The sealant 132 is provided on the insulation layer 140. Corresponding to the sealant region 131, the insulation layer 140 is provided with depressed portions 141. Depressed portions 141 are provided between the mesh-like metallic wires. That is, a mesh region is provided with the depressed portion 141. The size of each of the depressed portions 141 is equal to the size of a grid of the mesh-like metallic wires 120. The depressed portion 141 is dispensed with the sealant 132. Bottom faces of the depressed portion 141 are adhered to a surface that is of the first substrate 111 and that is close to the metallic wire 120.

The sealant region 131 is provided with the mesh-like metallic wires 120, to avoid affecting solidification of the sealant 132 due to the excessively wide width of the metallic wires 120. The upper surface 122 of each of the metallic wires 120 is covered by the insulation layer 140. Two sides of each of the metallic wires 120 are provided with depressed portions 141. That is, each mesh region is correspondingly provided with a depressed portion 141. The depressed portions 141 are dispensed with the sealant 132, so that the sealant 132 is in contact with the first substrate 111 in each mesh region, the area of a contact face between the sealant 132 and the first substrate 111 increases, an adhesive force between the sealant 132 and the first substrate 111 increases, and the path that is on a tangent plane of the peripheral region 130 and in which vapor enters the display region 110 becomes longer, thereby effectively reducing bubbles formed by the vapor entering the display region 110.

The panel of this application may be a Twisted Nematic (TN) panel, an In-Plane Switching (IPS) panel, or a Multi-domain Vertical Alignment (VA) panel, and may certainly be any other suitable type of panel.

The foregoing contents are detailed descriptions of this application in conjunction with specific embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising a display region and a peripheral region, wherein the display panel comprises:
   a first substrate;
   a second substrate, arranged opposite to the first substrate; and
   a sealant, disposed in the peripheral region, and adhering the first substrate with the second substrate in a sealed manner, wherein
   the peripheral region comprises a sealant region dispensed with the sealant, the first substrate is provided with at least one metallic wire in the sealant region, each of the at least one metallic wire is covered by an insulation layer, the sealant is disposed on the insulation layer, and the insulation layer comprises at least one depressed portion in the sealant region;
   wherein only one insulation layer is sandwiched between the at least one metallic wire and the sealant, the insulation layer being attached to both the at least one metallic wire and the sealant.

2. The display panel according to claim 1, wherein the at least one metallic wire is formed by hollowing out one metallic wire, or comprises metallic wires that are not in communication with each other.

3. The display panel according to claim 1, wherein the at least one metallic wire forms a first metallic wire group, one depressed portion is disposed on each of two sides of each first metallic wire group, and each depressed portion is dispensed with the sealant.

4. The display panel according to claim 3, wherein the first metallic wire group comprises one metallic wire, or comprises multiple metallic wires, and the multiple metallic wires are formed by hollowing out one metallic wire, or are formed by multiple metallic wires that are not in communication with each other, or are formed by hollowing out multiple metallic wires that are not in communication with each other.

5. The display panel according to claim 3, wherein the first metallic wire group comprises at least two metallic wires spaced away apart from each other, wherein one depressed portion is disposed on each of two outer sides of the first metallic wire group, and the sealant entirely covers the first metallic wire group and is dispensed in the depressed portions on the two outer sides.

6. The display panel according to claim 5, wherein a portion of the insulation layer is arranged between every two neighboring metallic wires in the first metallic wire group, a height of the portion of the insulation layer arranged between every two neighboring metallic wires relative to the first substrate is equal to a height of the portion of the insulation layer covering each metallic wire relative to the first substrate, and wherein the depressed portions are dispensed with the sealant.

7. The display panel according to claim 6, wherein the first metallic wire group comprises one metallic wire, or comprises multiple metallic wires, and the multiple metallic wires are formed by hollowing out one metallic wire, or are formed by multiple metallic wires that are not in communication with each other, or are formed by hollowing out multiple metallic wires that are not in communication with each other.

8. The display panel according to claim 6, wherein the portions of the insulation layer arranged between every two neighboring metallic wires in the first metallic wire group and the portions of the insulation layer covering every metallic wire of the first metallic wire group collectively define a level and continuous horizontal upper surface.

9. The display panel according to claim 1, wherein the at least one metallic wire comprises at least two metallic wires, the insulation layer covers and merely covers upper surfaces of the metallic wires, one depressed portion is disposed on each of two sides of each of the metallic wires, and a width of each of the depressed portions is equal to a distance between the corresponding two neighboring metallic wires, and the depressed portions are dispensed with the sealant.

10. The display panel according to claim 9, wherein the insulation layer is comprised between the depressed portions and the first substrate, and a thickness of the insulation layer in the depressed portions is less than a height of each of the metallic wires.

11. The display panel according to claim 9, wherein bottom faces of the depressed portions are adhered to a surface of one side that is of the first substrate and that is adjacent to the sealant.

12. The display panel according to claim 1, wherein there are at least two metallic wires, the insulation layer covers upper surfaces and two sides of the metallic wires, the insulation layer is closely adhered to upper surfaces and two sides of the metallic wires, and two sides of each of the metallic wires are provided with depressed portions, the width of each of the depressed portions is less than a distance between two neighboring metallic wires, and the depressed portions are dispensed with the sealant.

13. The display panel according to claim 12, wherein the insulation layer is comprised between the depressed portions and the first substrate, and the thickness of the insulation layer in the depressed portions is less than the height of each of the metallic wires.

14. The display panel according to claim 12, wherein bottom faces of the depressed portions are adhered to a surface of one side that is of the first substrate and that is adjacent to the sealant.

15. The display panel according to claim 1, wherein the depressed portions are step-shaped.

16. The display panel according to claim 1, wherein each of the at least one metallic wire is a mesh-shaped metallic wire, which is obtained by hollowing out portions of a metallic wire to create an array of through-holes in the metallic wire that are aligned in rows and columns, wherein the insulation layer is disposed on the at least one metallic wire and one depressed portion is defined in the insulation layer corresponding to each of the through-holes of the metallic wire, wherein a cross section of each depressed portion taken alone a plane parallel to a surface of the first substrate is congruent with a cross section of the respective through hole taken alone the plane parallel to a surface of the first substrate, and the sealant is dispensed to fill each depressed portion of the insulation layer.

17. A display panel, comprising a display region and a peripheral region, wherein the display panel comprises:
   a first substrate;
   a second substrate, arranged opposite to the first substrate; and
   a sealant, disposed in the peripheral region, and adhering the first substrate with the second substrate in a sealed manner, wherein
   the peripheral region comprises a sealant region dispensed with the sealant, the first substrate is provided with at least two metallic wires in the sealant region, upper surfaces of the metallic wires are covered by an insulation layer, the sealant is dispensed on the insulation layer, and the sealant region corresponding to the insulation layer is provided with a depressed portion, wherein only one insulation layer is sandwiched between the at least two metallic wires and the sealant, the insulation layer being attached to both the at least two metallic wires and the sealant;
   wherein two sides of each of the metallic wires are provided with depressed portions, the width of each of the depressed portion is equal to a distance between the respective two neighboring metallic wires, and each depressed portion is dispensed with the sealant; and
   wherein bottom faces of the depressed portions are adhered to a surface that is of the first substrate and that is adjacent to the metallic wires.

* * * * *